US011112639B2

(12) United States Patent
Lin

(10) Patent No.: US 11,112,639 B2
(45) Date of Patent: Sep. 7, 2021

(54) METHOD FOR SENSING BIOMETRIC OBJECT

(71) Applicant: MACROBLOCK, INC., Hsinchu (TW)

(72) Inventor: Yi-Sheng Lin, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 16/807,827

(22) Filed: Mar. 3, 2020

(65) Prior Publication Data

US 2020/0285092 A1 Sep. 10, 2020

(30) Foreign Application Priority Data

Mar. 8, 2019 (TW) ................................ 108107735

(51) Int. Cl.
*G02F 1/1333* (2006.01)
*G02F 1/133* (2006.01)
*G02F 1/1335* (2006.01)
*G06K 9/00* (2006.01)

(52) U.S. Cl.
CPC ...... *G02F 1/13338* (2013.01); *G02F 1/13306* (2013.01); *G02F 1/133514* (2013.01); *G06K 9/0004* (2013.01)

(58) Field of Classification Search
CPC ............. G02F 1/13338; G02F 1/13306; G02F 1/133514; G06K 9/0004
See application file for complete search history.

(56) References Cited

U.S. PATENT DOCUMENTS

| 6,553,134 | B1 | 4/2003 | Amano |
| 8,125,580 | B2 * | 2/2012 | Takama ............. G02F 1/13338 349/12 |
| 8,952,946 | B2 * | 2/2015 | Fukunaga ............. G06F 3/042 345/207 |
| 10,410,033 | B2 * | 9/2019 | He ....................... G06F 3/0418 |
| 10,546,176 | B2 * | 1/2020 | Xu ..................... G02F 1/134309 |

(Continued)

FOREIGN PATENT DOCUMENTS

| CN | 106773229 A | 5/2017 |
| CN | 108957856 A | 12/2018 |

(Continued)

OTHER PUBLICATIONS

Search Report issued to European counterpart application No. 20161364.3 by the EPO dated Aug. 5, 2020.

(Continued)

*Primary Examiner* — Utpal D Shah
(74) *Attorney, Agent, or Firm* — Akerman LLP; Peter A. Chiabotti

(57) ABSTRACT

A method for sensing a biometric object using an electronic device includes the steps of: (a) emitting a sensing light from a backlight unit upon the biometric object contacting a sensing region on a display surface, and allowing the sensing light to pass through a color filter unit and then reach and be reflected by the biometric object to return as a reflected light; and (b) controlling arrangement of liquid crystal molecules located in a first region of a liquid crystal layer to define a first light path, and allowing the reflected light having predetermined wavelengths to pass through the color filter unit and the first light path to reach and be detected by the optical sensing unit.

11 Claims, 3 Drawing Sheets

(56) References Cited

U.S. PATENT DOCUMENTS

| | | | |
|---|---|---|---|
| 10,768,506 B2* | 9/2020 | Chen | G02F 1/139 |
| 10,896,315 B2* | 1/2021 | Zeng | G06K 9/0004 |
| 10,969,613 B1* | 4/2021 | Ding | G02F 1/13338 |
| 2004/0252867 A1* | 12/2004 | Lan | G06K 9/0004 382/124 |
| 2008/0192237 A1 | 8/2008 | Yamamoto | |
| 2009/0268132 A1 | 10/2009 | Takama et al. | |
| 2010/0289784 A1 | 11/2010 | Fujioka et al. | |
| 2018/0225498 A1 | 8/2018 | Setlak | |

FOREIGN PATENT DOCUMENTS

| | | |
|---|---|---|
| JP | 2000207535 | 7/2000 |
| JP | 2008197148 | 8/2008 |
| KR | 20070002314 A | 1/2007 |
| TW | 201003205 A1 | 1/2010 |
| WO | 2009104667 A1 | 8/2009 |
| WO | 2011007482 A1 | 1/2011 |
| WO | 2017211152 A1 | 12/2017 |

OTHER PUBLICATIONS

Taiwan Intellectual Property Office, "Search Report appended to an Office Action," and English translation thereof, issued in Taiwanese patent application No. 108107735 dated Dec. 5, 2019, document of pages.

Office Action issued to Japanese counterpart application No. 2020039167 by the JPO dated Mar. 30, 2021, with translation.

Korean Intellectual Property Office, "Office Action" and English translation thereof, issued to Korean counterpart application No. 1020200028439, dated Jun. 29, 2021, document of 15 pages.

\* cited by examiner

METHOD FOR SENSING BIOMETRIC OBJECT

CROSS-REFERENCE TO RELATED APPLICATION

This application claims priority of Taiwanese Invention Patent Application No. 108107735, filed on Mar. 8, 2019.

FIELD

The disclosure relates to a sensing method, and more particularly to a method for sensing a biometric object.

BACKGROUND

Fingerprint is commonly used in electronic devices for verification or authentication of personal identity. It is desirable to have quick and accurate recognition of the fingerprint. Among many sensing techniques that have been widely developed, under-display sensing is one of the promising techniques used in fingerprint recognition. Sensing device utilizing such technique includes a fingerprint sensing module that is disposed under a touch screen. However, the position of the fingerprint sensing module in this type of sensing device makes the sensing light to be easily interfered or influenced by the touch screen, resulting in low sensitivity, low resolution and slow recognizing speed.

Referring to FIG. 1, a conventional under-display sensing device for generating three dimensional fingerprinting data is disclosed in U.S. Invention Patent Application Publication No. 2018/0225498 A1. The sensing device includes an array of pixels 13 serving as a light source, an optical image sensor 12 disposed under the pixels 13, a first optically clear adhesive (OCA) layer 14 disposed above the optical image sensor 12, a transparent support member 15 disposed above the first OCA layer 14, a pin hole array mask layer 16 spaced from the optical image sensor 12 by the transparent support member 15 and disposed under the pixels 13, a display encapsulation layer 17 covering the pixels 13, a second OCA layer 18 disposed over the display encapsulation layer 17, a transparent cover layer 19 disposed over the second OCA layer 18 and defining a finger placement surface, and optionally a light source 101 for directing light to a user's finger 10 or directing light to the optical image sensor 12. In particular, the pin hole array mask layer 16 has a plurality of openings 161 to permit light passing therethrough. When the user's finger 10 contacts the finger placement surface, a light from the pixels 13 is reflected by the finger 10, then passes through the openings 161 of the pin hole array mask layer 16, and finally is captured by the optical image sensor 12 for sensing. The image resolution may be controlled by adjusting the spacing between the openings 161, the diameter of each opening 161, and the thickness of the transparent support member 15 and the transparent cover layer 19, thereby increasing the resolution of the fingerprinting data. Moreover, the pin hole array mask layer 16 may further include lenses (not shown in FIG. 1) in the openings 161 to improve image quality and signal-to-noise ratio (SNR).

Despite the rapid development of fingerprint recognition, there is still a need for further improvement in the sensitivity of fingerprint sensing method.

SUMMARY

Therefore, an object of the disclosure is to provide a method for detecting a biometric object that can alleviate at least one of the drawbacks of the prior art.

The method for sensing a biometric object of this disclosure is performed using an electronic device. The electronic device includes a liquid crystal display (LCD) and an optical sensing unit disposed under the LCD. The LCD includes a display surface having a sensing region for the biometric object, and a color filter unit, a liquid crystal layer containing a plurality of liquid crystal molecules, and a backlight unit sequentially disposed under the display surface in such order.

The method of this disclosure includes steps of: (a) emitting a sensing light from the backlight unit upon the biometric object contacting the sensing region on the display surface, and allowing the sensing light to pass through the color filter unit and then reach and be reflected by the biometric object to return as a reflected light; and (b) controlling arrangement of the liquid crystal molecules located in a first region of the liquid crystal layer to define a first light path, and allowing the reflected light having predetermined wavelengths to pass through the color filter unit and the first light path to reach and be detected by the optical sensing unit. The first region is underneath the sensing region of the display surface and corresponds in position to the color filter unit.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
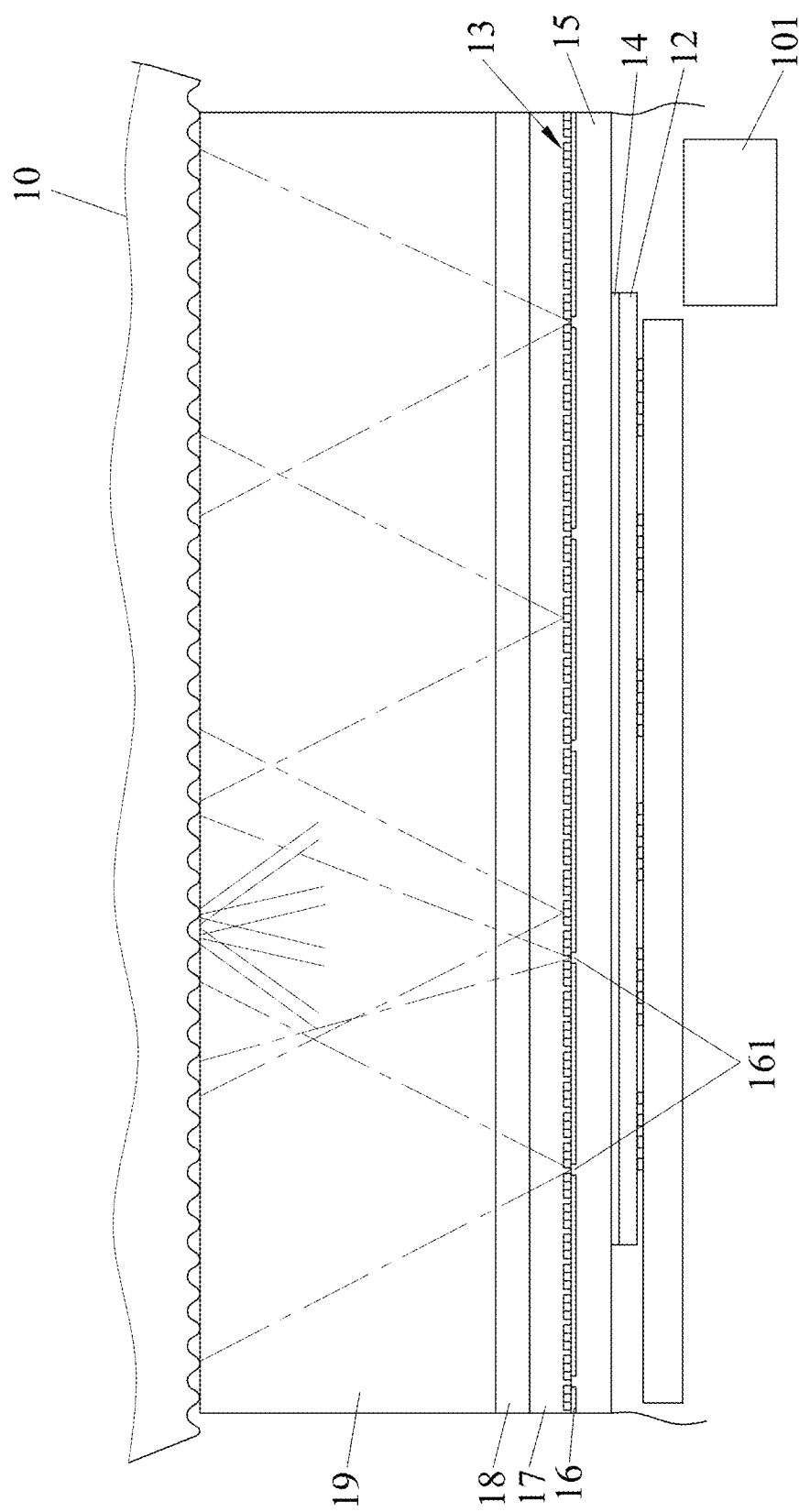
FIG. 1 is a schematic cross sectional view illustrating a conventional under-display sensing device.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
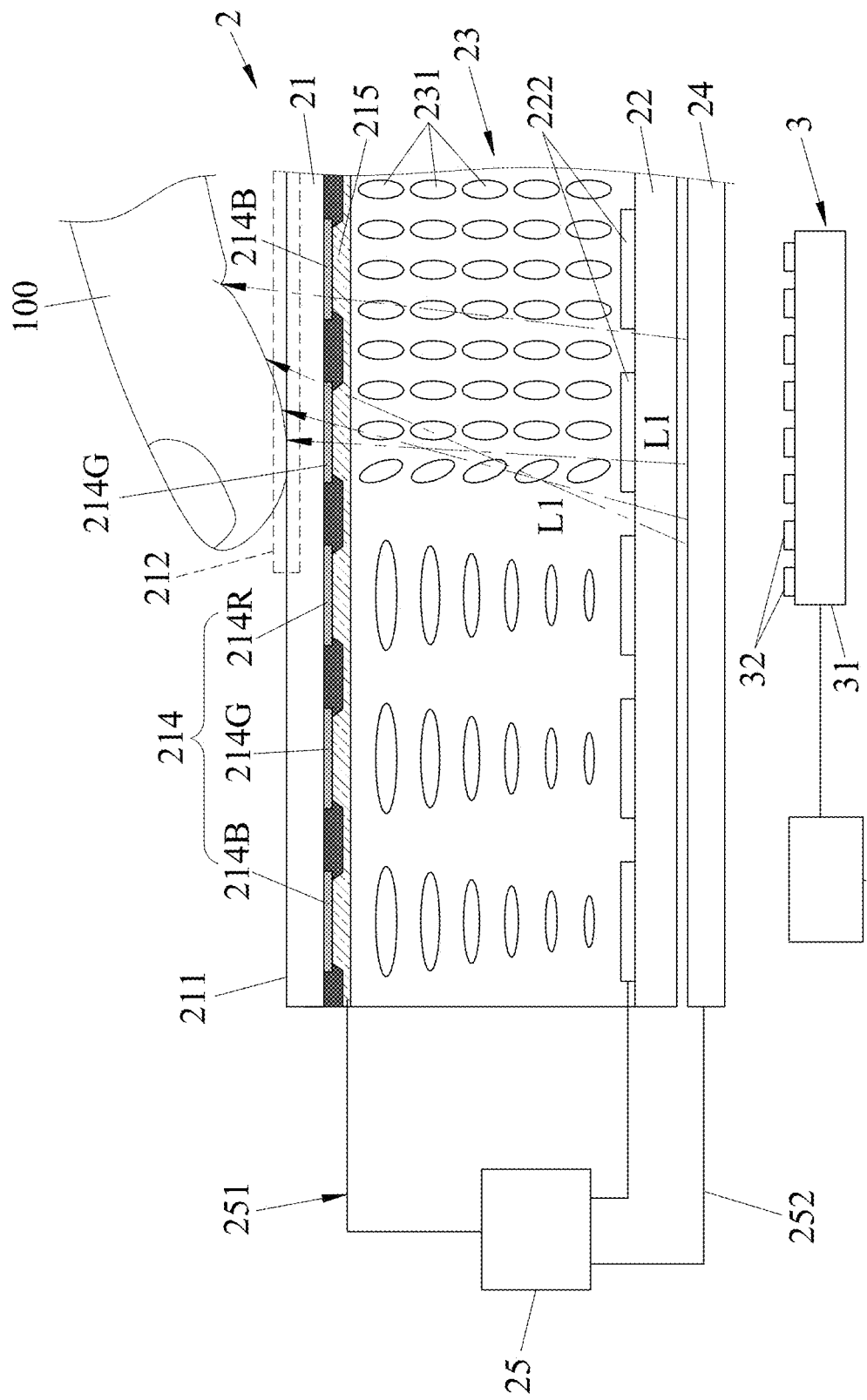
FIG. 2 is a schematic cross sectional view illustrating step (a) of an embodiment of a method for sensing a biometric object using an electronic device according to the disclosure.
Figure 3:
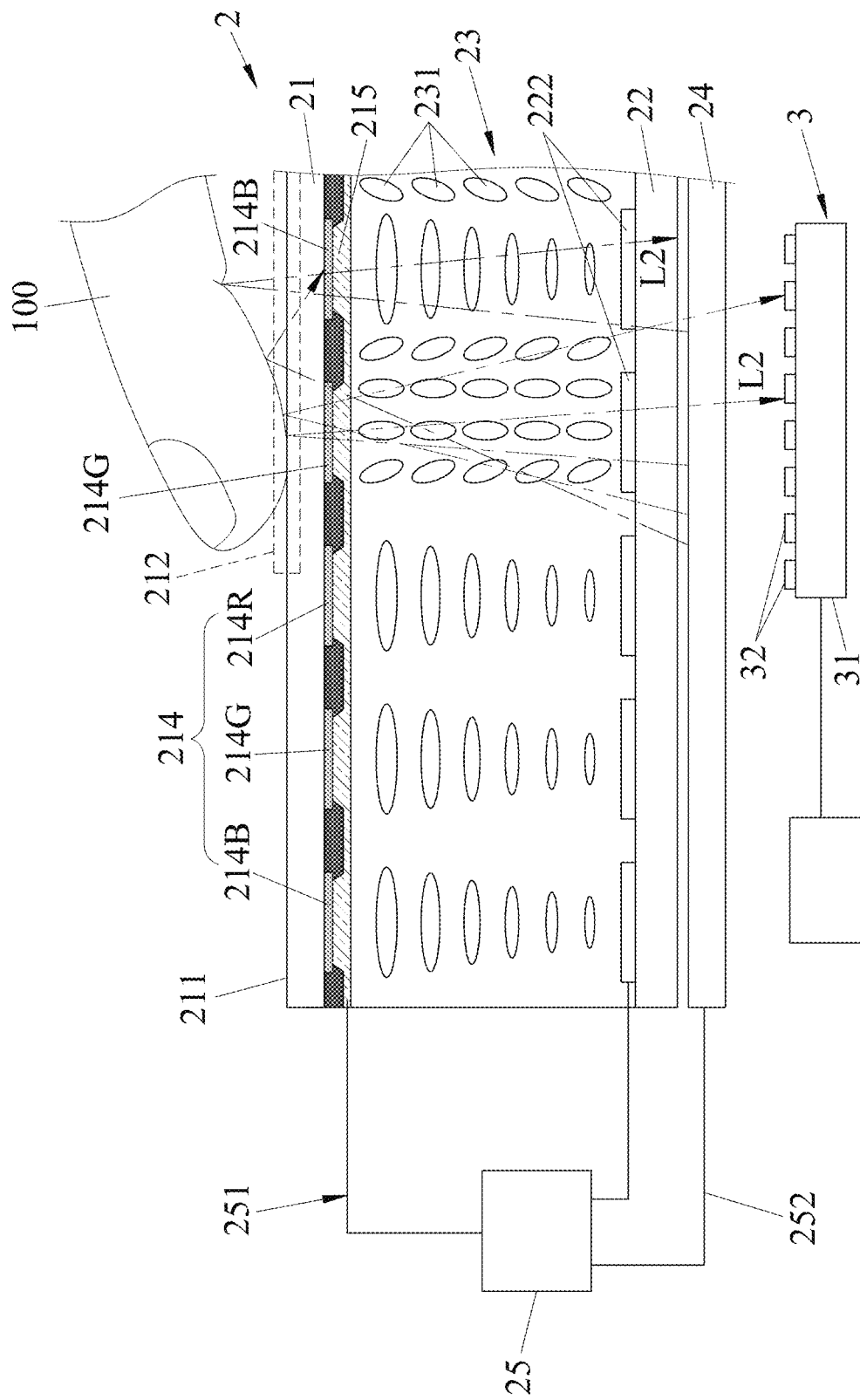
FIG. 3 is a schematic cross sectional view illustrating step (b) of the embodiment.

Referring to FIGS. 2 and 3, an embodiment of a method for sensing a biometric object 100 (such as a finger) using an electronic device is provided. The electronic device includes a liquid crystal display (LCD) 2, an optical sensing unit 3 disposed under the LCD 2 and a housing (not shown in the figures). The LCD 2 and the optical sensing unit 3 of the electronic device are integrated into the housing.

The LCD 2 includes a first transparent substrate 21, a second transparent substrate 22 spaced apart from the first transparent substrate 21, a liquid crystal layer 23 disposed between the first and second transparent substrates 21, 22, a backlight unit 24 disposed at a side opposite to the liquid crystal layer 23 for emitting a sensing light, and a control unit 25. The first transparent substrate 21 includes a display surface 211 opposite to the liquid crystal layer 23 and has a sensing region 212 for recognizing the biometric object 100. Taking mobile phone as an example, the sensing region 212 maybe a region of the home button for fingerprint recognition of the biometric object 100. A polarizing film, which is configured to polarize light, may be formed on each of the first and second transparent substrates 21, 22 (not shown in FIGS. 2 and 3).

The LCD 2 also includes a color filter unit 214 formed on the first transparent substrate 21 opposite to the display surface 211. That is, the color filter unit 214, the liquid crystal layer 23 and the backlight unit 24 are sequentially disposed under the display surface 211 in such order. The color filter unit 214 includes multiple color filters that contain at least two groups of color filters for filtering different colors of light. For example, the color filter unit 214 may include a first group of the color filters that is transparent to red light (simply referred to as red light filter 214R), a second group of the color filters that is transparent to green light (simply referred to as green light filter 214G), and a third group of the color filters that is transparent to blue light (simply referred to as blue light filter 214B).

The LCD 2 further includes a common electrode 215 formed on the color filter unit 214 opposite to the first transparent substrate 21, and a plurality of pixel electrodes 222 formed on the second transparent substrate 22 opposite to the backlight unit 24. The arrangement of the liquid crystal molecules 231 can be controlled by applying voltages between the common electrode 215 and the pixel electrodes 222. Moreover, the control unit 25 includes a first control circuit 251 connected between the common electrode 215 and the pixel electrodes 222 for controlling arrangement of the liquid crystal molecules 231, and a second control circuit 252 for controlling the backlight unit 24 to emit a sensing light L1. It should be noted that the structure, material and operation of each components of the LCD 2 are well known to a person skilled in the art, and thus a detailed description thereof is omitted herein for brevity.

The optical sensing unit 3 includes a circuit board 31, a plurality of optical sensing chips 32 disposed on the circuit board 31, a plurality of film transistors (not shown) electrically connected to the optical sensing chips 32, and a control circuit 33 electrically connected to the circuit board 31. The film transistors are communicatively connected to the control circuit 33 via the circuit board 31 and may control the signal transmission of the optical sensing chips 32 via the control circuit 33. In certain embodiments, a projection of the optical sensing unit 3 is located at the sensing region 212 on the display surface 211. The optical sensing chips 32 may be one of a charge-coupled device (CCD) and a complementary metal-oxide semiconductor (CMOS).

It should be noted that the control circuit 33 and the control unit 25 may be provided independently, or the control circuit 33 may be integrated into the control unit 25 of the LCD 2. As shown in FIG. 2, the control circuit 33 and the control unit 25 of the LCD 2 are provided independently.

According to this disclosure, the embodiment of the method for sensing the biometric object 100 using the abovementioned electronic device includes steps (a) and (b). In this embodiment, the electronic device is a mobile phone and the biometric object 100 is a user's finger for fingerprinting.

First, referring to FIG. 2, in step (a), a sensing light L1 is emitted from the backlight unit 24 when the biometric object 100 contacts the sensing region 212 on the display surface 211. The sensing light L1 is allowed to pass through the color filter unit 214 and then reach and be reflected by the biometric object 100 to return as a reflected light L2.

Referring to FIG. 3, in step (b), the arrangement of the liquid crystal molecules 231 located in a first region of the liquid crystal layer 23 is controlled to define a first light path. The first region is underneath the sensing region 212 of the display surface 211 and corresponds in position to the color filter unit 214. The reflected light L2 having predetermined wavelengths is allowed to pass through the color filter unit 214 and the first light path to reach and be detected by the optical sensing unit 3. Specifically, the reflected light L2 passes through at least one group of the color filters 214R, 214G, 214B located in a position corresponding to the first region of the liquid crystal layer 23 and the first light path, and then reaches and is detected by the optical sensing unit 3. In this embodiment, the color filter unit 214 includes three groups of color filters 214R, 214G, 214B for filtering red, green and blue colors of light, respectively, and in step (b), the arrangement of the liquid crystal molecules 231 located in the first region (i.e., corresponding in position to the green light filter 214G underneath the sensing region 212 of the display surface 211) is controlled by the first control circuit 251. As such, the reflected light L2 having the predetermined wavelengths ranging from 480 nm to 570 nm (i.e., green light) is allowed to pass through the green light filter 214G underneath the sensing region 212 of the display surface 211 and the first light path, and then reaches and is detected by the optical sensing unit 3.

In certain embodiments, the arrangement of the liquid crystal molecules 231 located in a remaining region of the liquid crystal layer 23 other than the first region is also controlled by the first control circuit 251. As shown in FIG. 3, the remaining region of the liquid crystal layer 23 includes a non-detected region not underneath the sensing region 212 of the display surface 211, and a region corresponding in position to the blue light filter 214B underneath the sensing region 212 of the display surface 211. With such arrangement, the reflected light L2 that does not have the predetermined wavelengths and that passes through the remainder of these groups of the color filters 214R, 214G, 214B (i.e., the red light filter 214R and blue light filter 214B) and the remaining region is blocked (e.g., by the polarizing film) and cannot reach and be detected by the optical sensing unit 3. Therefore, only the reflected light L2 having a wavelength range of green light is capable of passing through the LCD 2 and being detected by the optical sensing unit 3, thereby increasing the detection sensitivity.

In certain embodiments, step (a) includes controlling the arrangement of the liquid crystal molecules 231 located in a second region of the liquid crystal layer 23 to define a second light path, and allowing the sensing light L1 emitted from the backlight unit 24 to pass through the second light path and the color filters 214R, 214G, 214B located in a position corresponding to the second region of the liquid crystal layer 23 so as to reach the biometric object 100. The second region covers the first region. As shown in FIG. 2, the second region includes a first region corresponding in position to the green light filter 214G underneath the sensing region 212 of the display surface 211, and a region corresponding in position to the color filters (i.e. blue light filter 214B) underneath the sensing region 212 of the display surface 211. That is, the sensing light L1 passing through the green light filter 214G and the blue light filter 214B underneath the sensing region 212 of the display surface 211 reaches the biometric object 100. Alternatively, the second region may be the same as the first region, and thus the first light path is the same as the second light path, such that the sensing light L1 reaching the biometric object 100 may have similar wavelengths to the reflective light L2 to be detected by the optical sensing unit 3. For example, only the green light is capable of reaching the biometric object 100 and being detected by the optical sensing unit 3, thereby reducing the interference of light having undesired wavelengths so as to further improve the detection sensitivity.

In certain embodiments, in step (a), the liquid crystal molecules 231 located in the non-detected region other than the second region is also controlled such that the sensing light L1 that passes through the non-detected region is blocked (e.g., by the polarizing film) and is not emitted outside of the LCD 2.

To sum up, by virtue of using the color filter unit 214 and controlling of the arrangement of the liquid crystal molecules 231, only filtered light with predetermined wavelengths reaches the optical sensing unit 3 for sensing and the interference of the reflected light L2 that does not have the predetermined wavelengths can be reduced. Thus, the sensitivity of the method for sensing of this disclosure, which is performed using the electronic device is improved.

In the description above, for the purposes of explanation, numerous specific details have been set forth in order to provide a thorough understanding of the embodiments. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for sensing a biometric object using an electronic device, the electronic device including a liquid crystal display (LCD) and an optical sensing unit disposed under the LCD, the LCD including a display surface having a sensing region for the biometric object, and a color filter unit, a liquid crystal layer containing a plurality of liquid crystal molecules, and a backlight unit sequentially disposed under the display surface in such order, the method comprising steps of:
   (a) emitting a sensing light from the backlight unit upon the biometric object contacting the sensing region on the display surface, and allowing the sensing light to pass through the color filter unit and then reach and be reflected by the biometric object to return as a reflected light; and
   (b) controlling arrangement of the liquid crystal molecules located in a first region of the liquid crystal layer to define a first light path, the first region being underneath the sensing region of the display surface and corresponding in position to the color filter unit, and allowing the reflected light having predetermined wavelengths to pass through the color filter unit and the first light path to reach and be detected by the optical sensing unit.

2. The method of claim 1, wherein the color filter unit includes multiple color filters that contain at least two groups of color filters for filtering different colors of light, and in the step (b), the reflected light having the predetermined wavelengths passes through one of the at least two groups of the color filters located in a position corresponding to the first region of the liquid crystal layer and the first light path, and reaches and is detected by the optical sensing unit.

3. The method of claim 1, wherein in the step (b), the liquid crystal molecules located in a remaining region of the liquid crystal layer other than the first region is controlled such that the reflected light having wavelengths other than the predetermined wavelengths and that passes through the remainder of the at least two groups of the color filters and the remaining region is blocked from reaching and being detected by the optical sensing unit.

4. The method of claim 1, wherein step (a) includes controlling arrangement of the liquid crystal molecules located in a second region of the liquid crystal layer to define a second light path, the second region covering the first region, and allowing the sensing light emitted from the backlight unit to pass through the second light path and the color filter unit to reach the biometric object.

5. The method of claim 4, wherein in step (a), the liquid crystal molecules located in a non-detected region other than the second region is controlled such that the sensing light that passes through the non-detected region is blocked from being emitted outside of the LCD.

6. The method of claim 2, wherein the step (a) includes controlling arrangement of the liquid crystal molecules located in a second region of the liquid crystal layer to define a second light path, the second region covering the first region, and allowing the sensing light emitted from the backlight unit to pass through the second light path and the color filters located in a position corresponding to the second region of the liquid crystal layer to reach the biometric object.

7. The method of claim 1, wherein a projection of the optical sensing unit is located at the sensing region on the display surface.

8. The method of claim 7, wherein in step (b), the first region of the liquid crystal layer is located in a position corresponding to the projection of the optical sensing unit.

9. The method of claim 1, wherein the optical sensing unit includes a plurality of optical sensing chips.

10. The method of claim 9, wherein the optical sensing chips are one of a charge-coupled device (CCD) and a complementary metal-oxide semiconductor (CMOS).

11. The method of claim 1, wherein the LCD further includes a control unit that has a first control circuit for controlling arrangement of the liquid crystal molecules and a second control circuit for controlling the backlight unit to emit the sensing light.

* * * * *